US012079592B2

(12) United States Patent
Yoo et al.

(10) Patent No.: US 12,079,592 B2
(45) Date of Patent: Sep. 3, 2024

(54) DEEP NEURAL NETWORK ACCELERATOR INCLUDING LOOKUP TABLE BASED BIT-SERIAL PROCESSING ELEMENTS

(71) Applicant: SAMSUNG ELECTRONICS CO., LTD., Suwon-si (KR)

(72) Inventors: Hoi-Jun Yoo, Daejeon (KR); Jin Mook Lee, Seosan-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1045 days.

Patent file contains an affidavit/declaration under 37 CFR 1.130(b).

(21) Appl. No.: 16/689,199

(22) Filed: Nov. 20, 2019

(65) Prior Publication Data

US 2020/0160161 A1 May 21, 2020

(30) Foreign Application Priority Data

Nov. 20, 2018 (KR) .................. 10-2018-0143617
Nov. 15, 2019 (KR) .................. 10-2019-0146454

(51) Int. Cl.
*G06F 7/544* (2006.01)
*G06N 3/04* (2023.01)
(Continued)

(52) U.S. Cl.
CPC ............. *G06F 7/5443* (2013.01); *G06N 3/04* (2013.01); *G06N 3/063* (2013.01); *G06F 17/16* (2013.01); *G06F 2207/4824* (2013.01)

(58) Field of Classification Search
CPC ...... G06F 7/5443; G06F 7/527; G06F 7/4988; G06F 17/16; G06F 2207/4824; G06N 3/06; G06N 3/063
See application file for complete search history.

(56) References Cited

U.S. PATENT DOCUMENTS

| 5,091,864 A | 2/1992 | Baji et al. |
| 5,402,519 A | 3/1995 | Inoue et al. |
| 6,888,372 B1* | 5/2005 | Hazanchuk ............ G06F 7/523 |
| | | 326/38 |

(Continued)

FOREIGN PATENT DOCUMENTS

| KR | 10-2017-0099848 A | 9/2017 |
| KR | 10-2018-0050928 A | 5/2018 |

(Continued)

OTHER PUBLICATIONS

J. Lee, C. Kim, S. Kang, D. Shin, S. Kim and H.-J. Yoo, "UNPU: An Energy-Efficient Deep Neural Network Accelerator With Fully Variable Weight Bit Precision," in IEEE Journal of Solid-State Circuits, vol. 54, No. 1, pp. 173-185, Oct. 4, 2018, doi: 10.1109/JSSC.2018.2865489. (Year: 2018).*

(Continued)

*Primary Examiner* — Andrew Caldwell
*Assistant Examiner* — Carlo Waje
(74) *Attorney, Agent, or Firm* — Sughrue Mion, PLLC

(57) ABSTRACT

A deep neural network accelerator includes a feature loader that stores input features, a weight memory that stores a weight, and a processing element. The processing element applies 1-bit weight values to the input features to generate results according to the 1-bit weight values, receives a target weight corresponding to the input features from the weight memory, and selects a target result corresponding to the received target weight from among the results to generate output features.

17 Claims, 16 Drawing Sheets

(51) Int. Cl.
*G06N 3/063* (2023.01)
*G06F 17/16* (2006.01)

(56) References Cited

U.S. PATENT DOCUMENTS

| | | | |
|---|---|---|---|
| 9,971,540 | B2 | 5/2018 | Herrero Abellanas et al. |
| 10,755,126 | B2 | 8/2020 | Son et al. |
| 2016/0179434 | A1 | 6/2016 | Herrero Abellanas et al. |
| 2018/0129893 | A1 | 5/2018 | Son et al. |
| 2018/0330123 | A1* | 11/2018 | Colombo .............. G06F 9/4486 |
| 2020/0372276 | A1 | 11/2020 | Son et al. |

FOREIGN PATENT DOCUMENTS

| | | |
|---|---|---|
| WO | 2016/186823 A1 | 11/2016 |
| WO | 2017/201627 A1 | 11/2017 |
| WO | 2018/103736 A1 | 6/2018 |

OTHER PUBLICATIONS

D. Shin, J. Lee, J. Lee, J. Lee and H.-J. Yoo, "DNPU: An Energy-Efficient Deep-Learning Processor with Heterogeneous Multi-Core Architecture," in IEEE Micro, vol. 38, No. 5, pp. 85-93, Sep. 27, 2018, doi: 10.1109/MM.2018.053631145. (Year: 2018).*

Communication issued Jun. 27, 2022 by the Korean Intellectual Property Office in counterpart Korean Patent Application No. 10-2019-0146454.

Jinmook Lee, et al., "UNPU: A 50.6TOPS/W Unified Deep Neural Network Accelerator with 1b-to-16b Fully-Variable Weight Bit-Precision", IEEE International Solid-State Circuits Conference, 2018.

Yong-Deok Kim, et al., "Compression of Deep Convolutional Neural Networks for Fast and Low Power Mobile Applications", arXiv:1511.06530v2, Feb. 24, 2016.

Liangzhen Lai, et al., "Deep Convolutional Neural Network Inference with Floating-pointWeights and Fixed-point Activations", arXiv:1703.03073v1, Mar. 8, 2017.

Patrick Judd, et al., "Stripes: Bit-Serial Deep Neural Network Computing", IEEE, 2016.

Chenzhu Zhu, et al., "Trained Ternary Quantization", arXiv:1612.01064v3, Feb. 23, 2017.

Mohammad Rastegari, et al., "XNOR-Net: ImageNet Classification Using Binary Convolutional Neural Networks", arXiv:1603.05279v4, Aug. 2, 2016.

Qinyao He, et al., "Effective Quantization Methods for Recurrent Neural Networks", arXiv:1611.10176v1, Nov. 30, 2016.

Norman P. Jouppi, et al., "In-Datacenter Performance Analysis of a Tensor Processing Unit", ISCA '17, 2017.

Dongjoo Shin, et al., "DNPU: An 8.1TOPS/W Reconfigurable CNN-RNN Processor for General-Purpose Deep Neural Networks", IEEE International Solid-State Circuits Conference, 2017.

Shouyi Yin, et al., "A 1.06-to-5.09 TOPS/W Reconfigurable Hybrid-Neural-Network Processor for Deep Learning Applications", 2017 Symposium on VLSI Circuits Digest of Technical Papers, 2017.

Kodai Ueyoshi, et al., "QUEST: A 7.49TOPS Multi-Purpose Log—Quantized DNN Inference Engine Stacked on 96MB 3D SRAM Using Inductive-Coupling Technology in 40nm CMOS", IEEE International Solid-State Circuits Conference, 2018.

* cited by examiner

DEEP NEURAL NETWORK ACCELERATOR INCLUDING LOOKUP TABLE BASED BIT-SERIAL PROCESSING ELEMENTS

CROSS-REFERENCE TO RELATED APPLICATIONS

This application claims priority under 35 U.S.C. § 119 to Korean Patent Application Nos. 10-2018-0143617 filed on Nov. 20, 2018 and 10-2019-0146454 filed on Nov. 15, 2019, in the Korean Intellectual Property Office, the disclosures of which are incorporated by reference herein in their entireties.

BACKGROUND

The inventive concept relates to a deep neural network processor, and more particularly, relates to a deep neural network accelerator including lookup table based bit-serial processing elements.

Deep learning may be a process of training a deep neural network (DNN) implemented with the aggregation of neurons and weights by using a database. An inference result may be obtained by inputting input data to the trained DNN. The DNN may be implemented with a convolutional neural network (CNN), a recurrent neural network (RNN), and a fully-connected DNN (FCDNN), and a type of the DNN may depend on an inference purpose.

For example, in the case of training the DNN, a weight may be trained by using the 32-bit or 64-bit floating point arithmetic. Because weights of the trained DNN have a bit-scalable characteristic, a weight that has the precision of less than 32 bits or 64 bits may be used to process input data. In this case, the amount of weights to be read from a memory may decrease. Because a plurality of low bit-precision processing elements are capable of being used under a given hardware resource, the throughput of inference may be improved. That is, the energy efficiency of the DNN inference arithmetic may be improved. However, because the minimum bit-precision scalable in various DNNs or layers of the DNN is variable, there is required an arithmetic unit supporting adaptive weight bit-precision.

SUMMARY

The inventive concept may provide a deep neural network accelerator including lookup table based bit-serial processing elements supporting various bit-precisions.

Also, the inventive concept may provide a deep neural network accelerator including bit-serial processing elements having an improved power efficiency by reusing an input characteristic by using a lookup table.

According to an exemplary embodiment, a deep neural network accelerator includes a feature loader that stores input features, a weight memory that stores a weight, and a processing element. The processing element applies 1-bit weight values to the input features to generate results according to the 1-bit weight values, receives a target weight corresponding to the input features from the weight memory, and selects a target result corresponding to the received target weight from among the results to generate output features.

For example the processing element receives first bits of the target weight during a first time, selects a first target result corresponding to the first bits from among the results, receives second bits of the target weight during a second time after the first time, selects a second target result corresponding to the second bits from among the results, and accumulates the second target result on the first target result.

For example the processing element generates all combinations of the 1-bit weight values, and calculates a partial product of the input features and the 1-bit weight values with respect to each of the combinations to generate the results.

For example the target weight includes first weight values corresponding to each of the input features and a second weight value deciding whether to invert the target result, and the first weight values and the second weight value are a 1-bit weight having a first value or a second value. For example, when the second weight value is the first value, the processing element selects the target result based on the first weight values and generates the output features based on the target result. When the second weight value is the second value, the processing element inverts the first weight values to select the target result and inverts the target result to generate the output features.

For example the target weight includes weight values respectively corresponding to the input features, the number of bits of each of the weight values is more than one. For example, the processing element selects a first target result based on least significant bits of the weight values, selects a second target result based on bits of the weight values, which are positioned between the least significant bits and most significant bits of the weight values, and selects a third target result based on the most significant bits of the weight values. For example the processing element bit-shifts the second target result, adds the bit-shifted second target result to the first target result to generate an intermediate accumulation result, and bit-shifts the third target result to subtract the bit-shifted third target result from the intermediate accumulation result.

For example the processing element includes a first lookup table bundle that generates first results corresponding to first features of the input features, receives a first target weight corresponding to the first features from the weight memory, and outputs a first target result corresponding to the first target weight from among the first results, a second lookup table bundle that generates second results corresponding to second features of the input features, receives a second target weight corresponding to the second features from the weight memory, and outputs a second target result corresponding to the second target weight from among the second results, and an accelerator that accumulates the first target result and the second target result to generate the output features.

For example the processing element includes a multiplexer that outputs the input features received from the feature loader or the target weight received from the weight memory, based on an update signal, a first lookup table module that stores first results corresponding to first features of the input features, receives a first target weight, which is a first portion of the output target weight, corresponding to the first features from the multiplexer, and outputs a first target result corresponding to the first target weight from among the first results, a second lookup table module that stores second results corresponding to second features of the input features, receives a second target weight, which is a second portion of the output target weight, corresponding to the second features from the multiplexer, and outputs a second target result corresponding to the second target weight from among the second results, and a module adder that generates the first results based on the first features, generates the second results based on the second features, and accumulates the first and second target results.

For example the processing element includes file registers that store the results, and multiplexers that receives the target weight and to select the target result from the file registers. For example, the processing element further includes a weight input circuit that receives weight values as much as the number of bits identical to a product of the number of the input features and the number of the multiplexers, at the target weight, and transfers the received weight values to the multiplexers.

For example the feature loader aligns a first portion of a first input feature map and a second portion of a second input feature map to generate the input features.

According to an exemplary embodiment, a deep neural network accelerator includes deep neural network cores, each of which generates an output feature map based on an input feature map and a weight, and an aggregation core that receives the output feature map from each of the deep neural network cores and accumulates the received output feature map to generate a final output feature map. Each of the deep neural network cores includes a weight memory that stores the weight, feature loaders, each of which stores input features being a portion of the input feature map, and processing elements, each of which receives the input features from one of the feature loaders and generates output features to be included in the output feature map based on a target weight corresponding to the input features, and each of the processing elements generates results according to the 1-bit weight values by applying the 1-bit weight values to the input features and generates the output features as a result of selecting a target result corresponding to the received target weight from among the results.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, embodiments of the inventive concept will be described clearly and in detail with reference to accompanying drawings to such an extent that an ordinary one in the art implements embodiments of the inventive concept.

Figure 1:
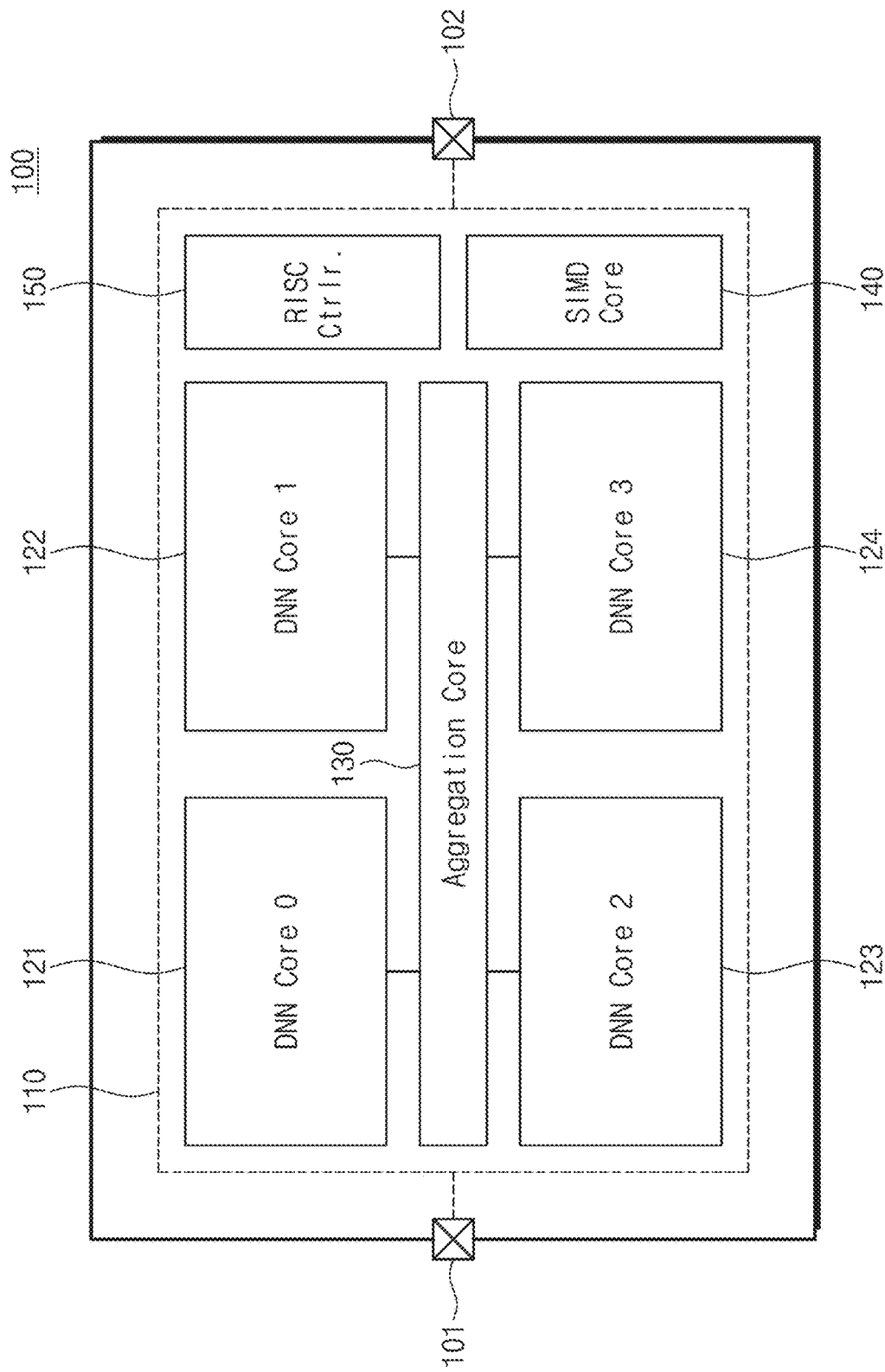
FIG. 1 is a block diagram of a deep neural network accelerator according to an embodiment of the inventive concept.

FIG. 1 is a block diagram of a deep neural network (DNN) accelerator according to an embodiment of the inventive concept. Referring to FIG. 1, a DNN accelerator 100 may include gateways 101 and 102, a network on-chip (NoC) 110, deep neural network (DNN) cores 121, 122, 123, and 124, an aggregation core 130, a single instruction multiple data (SIMD) core 140, and a reduced instruction set computer (RISC) controller 150. The architecture of the DNN accelerator 100 illustrated in FIG. 1 is exemplary and is not limited to FIG. 1. For example, the DNN accelerator 100 may include three or less DNN cores or five or more DNN cores.

The gateways 101 and 102 may connect the DNN accelerator 100 with an external memory (not illustrated) or the like. The gateways 101 and 102 may be used to transfer weights or a feature map stored in the external memory (not illustrated) to the DNN accelerator 100 or to transfer processing results of the DNN accelerator 100 to the external memory (not illustrated).

For example, the network on-chip 110 may be of a two-dimensional mesh type. The network on-chip 110 may be connected to the gateways 101 and 102. The network on-chip 110 may provide a data transfer path between the DNN cores 121 to 124, the aggregation core 130, the SIMD core 140, and the RISC controller 150.

The DNN cores 121 to 124 may generate partial sums by independently performing operations on input features and weights. Output features may be generated depending on an accumulation of the partial sums. Each of the DNN cores 121 to 124 may include lookup table based bit-serial processing elements. As such, each of the DNN cores 121 to 124 may support various bit-precisions and may reuse an input feature. The DNN cores 121 to 124 will be more fully described below.

The aggregation core 130 may receive partial sums (or output features) from each of the DNN cores 121 to 124 through a dedicated path different from the network on-chip 110. The aggregation core 130 may aggregate the output features received from each of the DNN cores 121 to 124 and may generate a final output feature map.

The SIMD core 140 may perform vector processing (e.g., a non-linear activation function or an element-wise multiplication) on the final output feature map and may generate final output results. For example, the activation function may be implemented by using piecewise linear approximation.

In a DNN operation, the RISC controller 150 may be used to execute an instruction. The instruction may be an instruction that is required to perform data communication between internal cores through the network on-chip 110.

Figure 2:
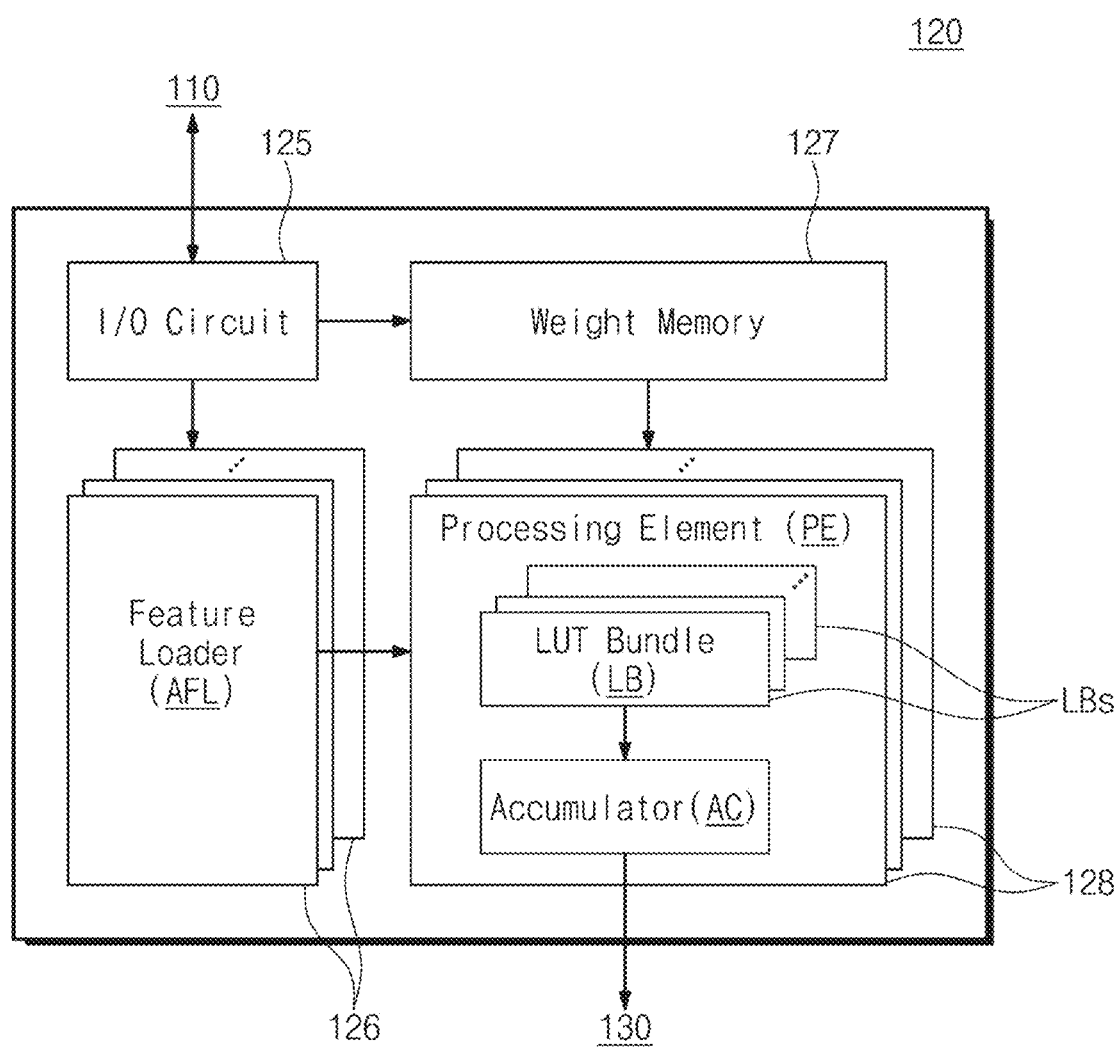
FIG. 2 is an exemplary block diagram illustrating a DNN core of FIG. 1.

FIG. 2 is an exemplary block diagram illustrating a DNN core of FIG. 1. A DNN core 120 illustrated in FIG. 2 corresponds to one of the DNN cores 121 to 124 of FIG. 1. Referring to FIG. 2, the DNN core 120 may include an input/output circuit 125, feature loaders 126, a weight memory 127, and processing elements 128.

The input/output circuit 125 may be configured to perform data communication between the DNN core 120 and the network on-chip 110. For example, the input/output circuit 125 may include a switch for a data transfer between the DNN core 120 and the network on-chip 110, a direct memory access (DMA) controller for controlling a direct transfer of data, a custom command decoder, and a controller for a custom command set.

The feature loaders 126 may be aligned feature map loaders (AFL). The number of feature loaders 126 may be equal to the number of processing elements 128. The feature loaders 126 may receive input feature maps through the input/output circuit 125 from the outside. The feature loaders 126 may be designed to decrease an access of an external memory, which is required to fetch an input feature map, by utilizing data locality during a convolution operation. The feature loaders 126 may be a buffer that provides required input feature maps to the processing elements 128, after aligning and storing the input feature maps. The alignment of the input feature maps may enable the DNN operation of the processing elements 128 regardless of whether a network being currently accelerated is a convolution layer, a recurrent layer, or a fully-connected layer.

The weight memory 127 may be configured to store weights for a deep neural network operation. The weight memory 127 may receive weights through the input/output circuit 125 from the outside. The weight memory 127 may provide required weights to the processing elements 128.

The processing elements 128 may perform the matrix multiplication for the DNN operation. The processing elements 128 may perform a multiply-and-accumulate (MAC) operation on a weight having various bit-precisions in a bit-serial manner. For example, the processing elements 128 may support the MAC operation with all weight bit-precisions from 1 bit to 16 bits. The processing elements 128 may perform the MAC operation by using a lookup table LUT. To this end, each of the processing elements 128 may include LUT bundles LBs and an accumulator AC.

One LUT bundle LB may include a plurality of LUT modules. The LUT bundle LB may perform the MAC operations by accessing the LUT that is managed at the LUT module. The LUT may be used to map an input feature value corresponding to a particular weight value. In the matrix multiplication of an input feature and a weight matrix, the input feature may be reused as much as the number of rows or columns of the weight matrix. The processing elements 128 may reuse the input feature map several times by using the LUT and may improve an energy efficiency in the matrix multiplication.

The accumulator AC may accumulate partial sums being matrix multiplication results from the LUT bundles LBs and may generate the output feature map. The output feature map (or an output feature) may be output to the aggregation core 130 through a dedicated path.

Figure 3:
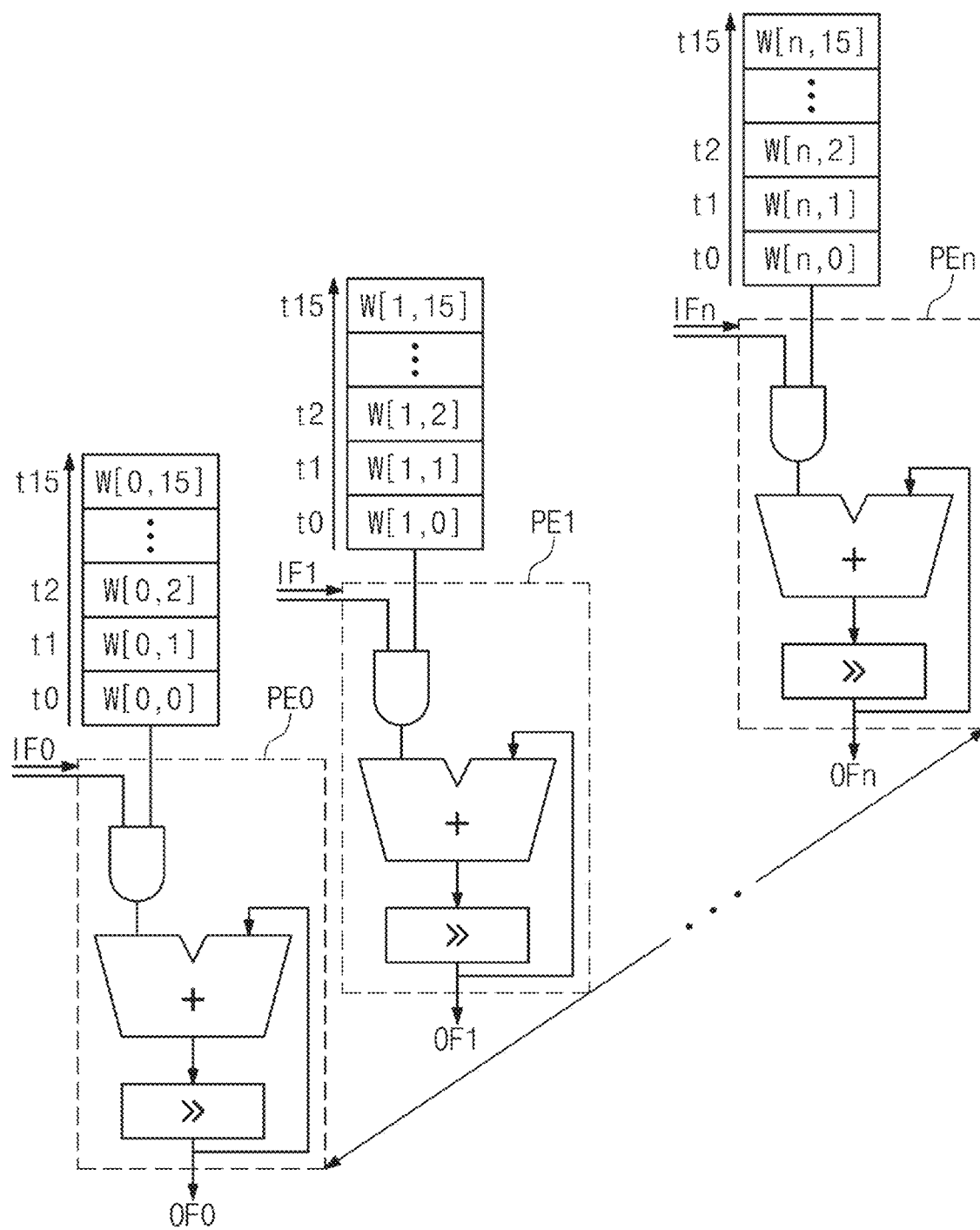
FIG. 3 is a diagram for describing a lookup table based bit-serial processing operation performed at processing elements of FIG. 2.

FIG. 3 is a diagram for describing a lookup table based bit-serial processing operation performed at processing elements of FIG. 2. Referring to FIG. 3, it is assumed that the number of processing elements 128 is "n" (PE0, PE1 . . . PEn), for example. Each of the "n" processing elements PE0 to PEn may perform the DNN operation with various weight bit-precisions of 1 bit to 16 bits through the repetition of the MAC operation of a 1-bit weight.

The processing elements PE0 to PEn may respectively receive input features IF0, IF1 . . . IFn from the feature loaders 126 and may respectively receive weights from the weight memory 127. A weight may be provided to each of the processing elements PE0 to PEn in units of one bit. For example, at a first time t0, the first processing element PE0 may perform logical multiplication, accumulation, and a shift operation of the input feature IF0 and a weight W[0,0]. At a second time t2 after the first time t1, the first processing element PE0 may perform logical multiplication of the input feature IF0 and a weight W[0,1], may accumulate a result of the logical multiplication and the result of the first time t1, and may perform the shift operation. Based on this repetition, the processing elements PE0 to PEn may generate output features OF0, OF1 . . . OFn.

The input features IF0 to IFn may be reused during first to sixteenth times t0 to t15. A bit-serial operation may be used for a weight. This reuse may decrease an access of an external memory for an input feature by using a lookup table and may decrease power consumption of the DNN accelerator 100. Compared with an existing fixed point arithmetic unit, the power consumption of the DNN accelerator 100 may decrease as much as 23.1%, 27.2%, 41%, and 53.6% at of 15-bit, 8-bit, 4-bit, and 1-bit precisions, respectively.

Figure 4:
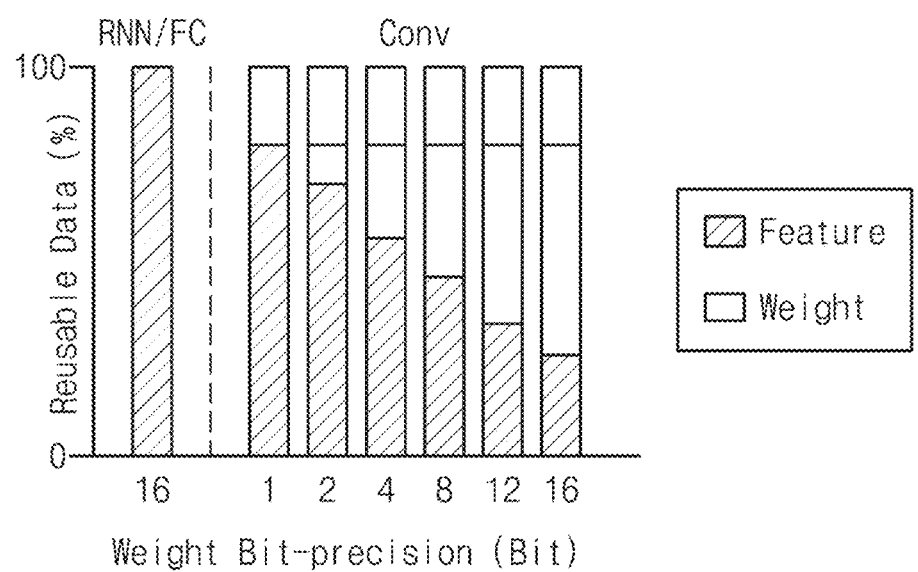
FIG. 4 is a graph for describing a reuse of a feature described with reference to FIG. 3.

FIG. 4 is a graph for describing a reuse of a feature described with reference to FIG. 3. A ratio of reusable data according to a weight bit-precision is illustrated in FIG. 4. A ratio of reusable data indicates a ratio between a reusable feature and a reusable weight.

In the RNN and FCDNN, regardless of a bit-precision of a weight, it is impossible to reuse a weight and it is possible to reuse only a feature. Accordingly, a feature map is reused in the RNN and FCDNN operations.

In contrast, in the CNN, it is possible to reuse a weight and a feature. As a weight bit-precision decreases, the number of reusable features may be more than the number of reusable weights. That is, as a weight bit-precision decreases, a CNN arithmetic feature may become close to the RNN and FCDNN. In the CNN operation, the DNN accelerator 100 of the inventive concept may convert a feature map to a one-dimension vector for the purpose of reusing the feature map.

As such, the DNN accelerator 100 may support all the CNN, RNN, and FCDNN operations. The DNN accelerator 100 may support various weight bit-precisions through the lookup table based bit-serial processing operation and the reuse, which are described with reference to FIG. 3. Depending on a DNN type, the DNN accelerator 100 may adjust the number of processing elements 128 performing the CNN and the number of processing elements 128 performing the RNN or FCDNN.

Figure 5:
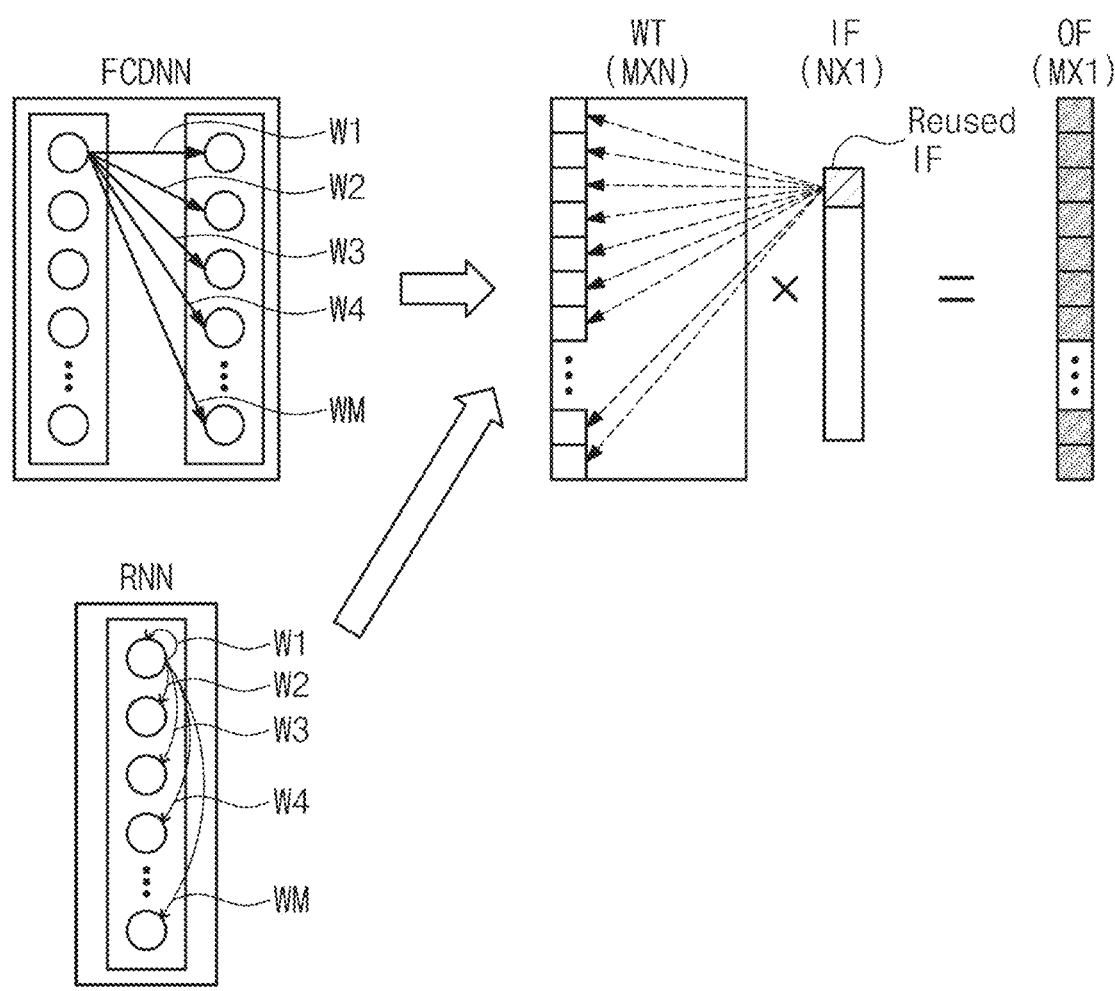
FIGS. 5 to 7 are diagrams for describing how to perform an FCDNN or RNN operation by using processing elements described with reference to FIGS. 1 and 2.
Figure 6:
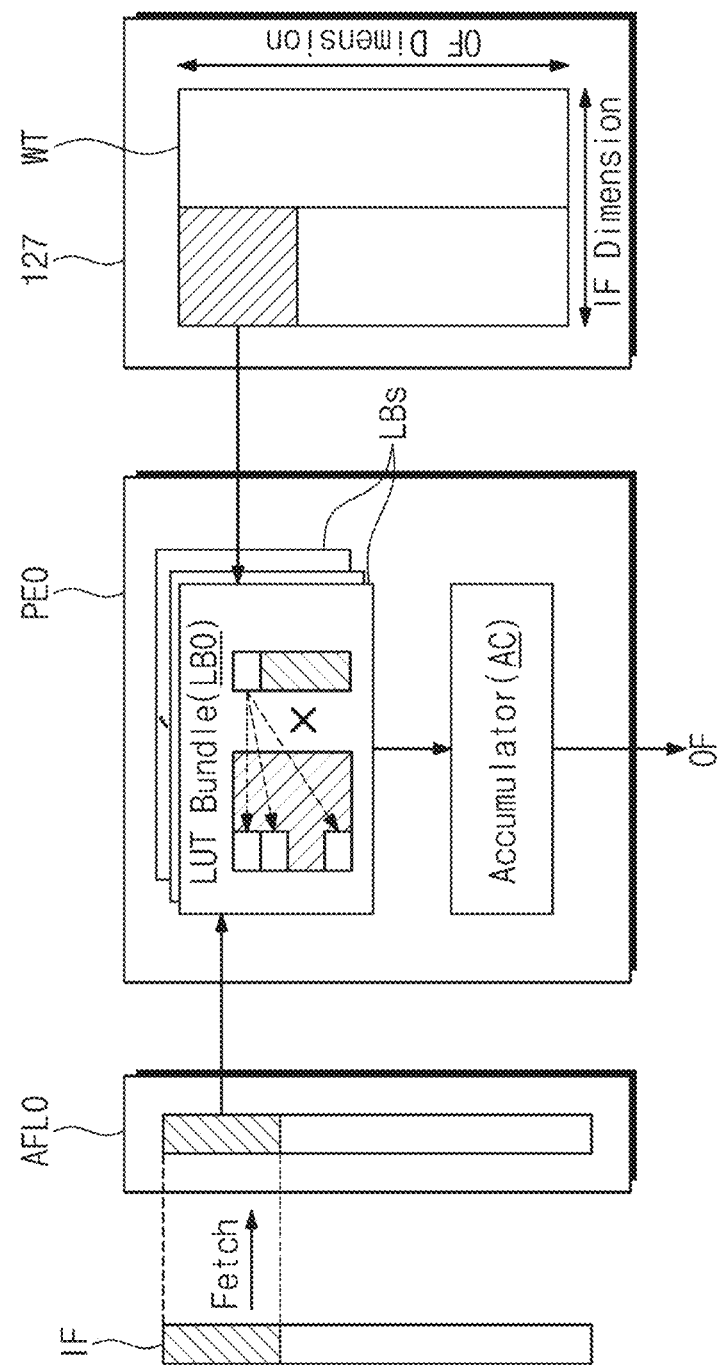
Figure 7:
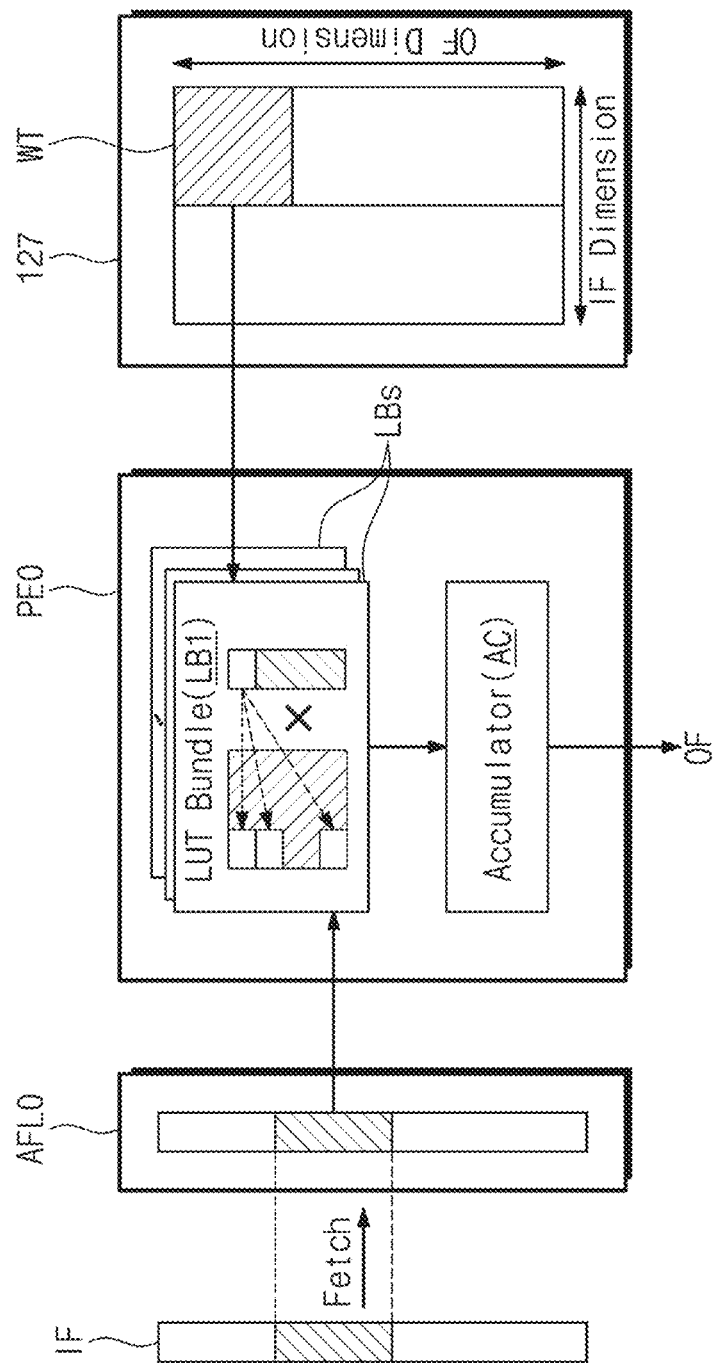

FIGS. 5 to 7 are diagrams for describing how to perform an FCDNN or RNN operation by using processing elements described with reference to FIGS. 1 and 2.

Referring to FIG. 5, an input feature map IF may be expressed by a one-dimensional feature vector, and a weight WT may be expressed by a two-dimensional matrix. In the FCDNN or RNN operation, "N" input features of the input feature map IF may be multiplied with "M" weight values W1 to WM for the purpose of the matrix multiplication. That is, one input feature may be reused "M" times. An operation associated with one input feature is illustrated in FIG. 5, but each of the remaining input features may be reused "M" times. An output feature map OF may be generated as a matrix multiplication result. The output feature map OF may be expressed by a one-dimensional feature vector and may include "M" output features. The output features may be a result of accumulating partial sums of the multiplication of input features and a weight.

In the FCDNN, a feature map (i.e., the output feature map OF) corresponding to a second layer may be generated by applying the weight WT to a feature map (i.e., the input feature map IF) corresponding to a first layer. In the RNN, a feature map (i.e., the output feature map OF) corresponding to a second time may be generated by applying the weight WT to a feature map (i.e., the input feature map IF) corresponding to a first time.

Referring to FIG. 6, the input feature map IF may be fetched to a feature loader AFL0. The input feature map IF may be expressed by a one-dimensional feature vector. A first LUT bundle LB0 of the first processing element PE0 may be provided with partial features of the input feature map IF. The first LUT bundle LB0 may be provided with a weight corresponding to the received features from among weights WT stored in the weight memory 127. The weight WT may be expressed by a two-dimensional matrix. The first LUT bundle LB0 may generate partial sums based on the matrix multiplication of the received input features and weights. To this end, the input features may be reused at the first LUT bundle LB0. The accumulator AC may accumulate partial sums output from the first LUT bundle LB0.

Referring to FIG. 7, a second LUT bundle LB1 of the first processing element PE0 may be provided with partial features of the input feature map IF. The input features that the first LUT bundle LB0 receives may be different from the input features that the second LUT bundle LB1 receives. The second LUT bundle LB1 may be provided with a weight corresponding to the received features from among weights WT stored in the weight memory 127. The weights that the first LUT bundle LB0 may be different from the weights that the second LUT bundle LB1 receives. The second LUT bundle LB1 may generate partial sums based on the matrix multiplication of the received input features and weights. To this end, the input features may be reused at the second LUT bundle LB1. The accumulator AC may accumulate the partial sums output from the LUT bundles LBs including the first LUT bundle LB0 and the second LUT bundle LB1. The output feature map OF may be generated from the accumulator AC as an accumulation result.

Figure 8:
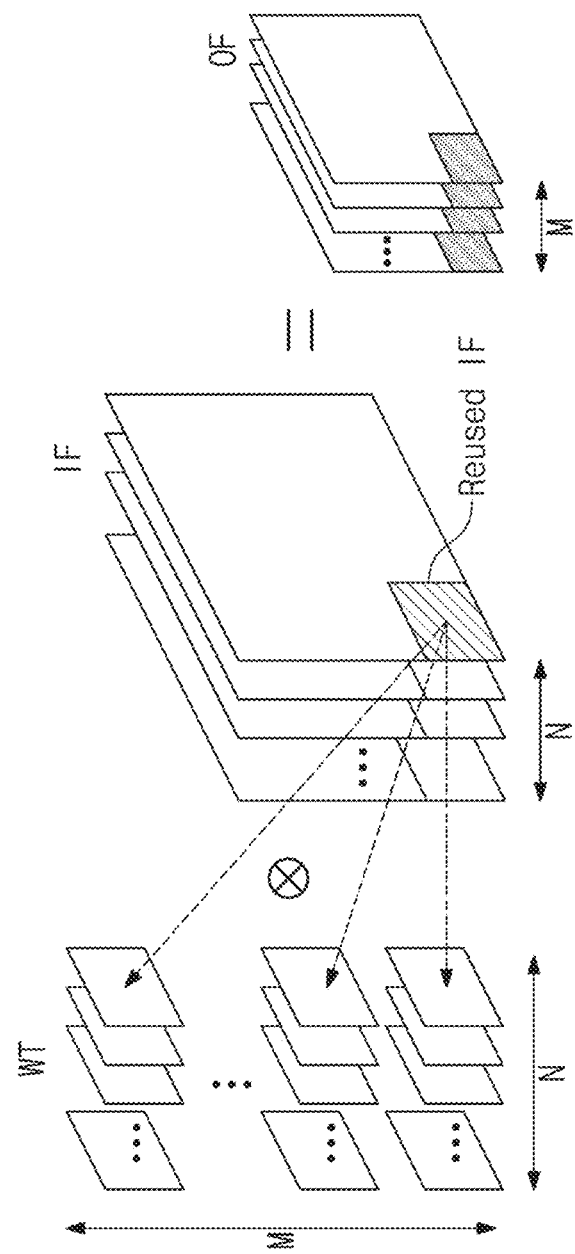
FIGS. 8 to 10 are diagrams for describing how to perform a CNN operation by using processing elements described with reference to FIGS. 1 and 2.
Figure 9:
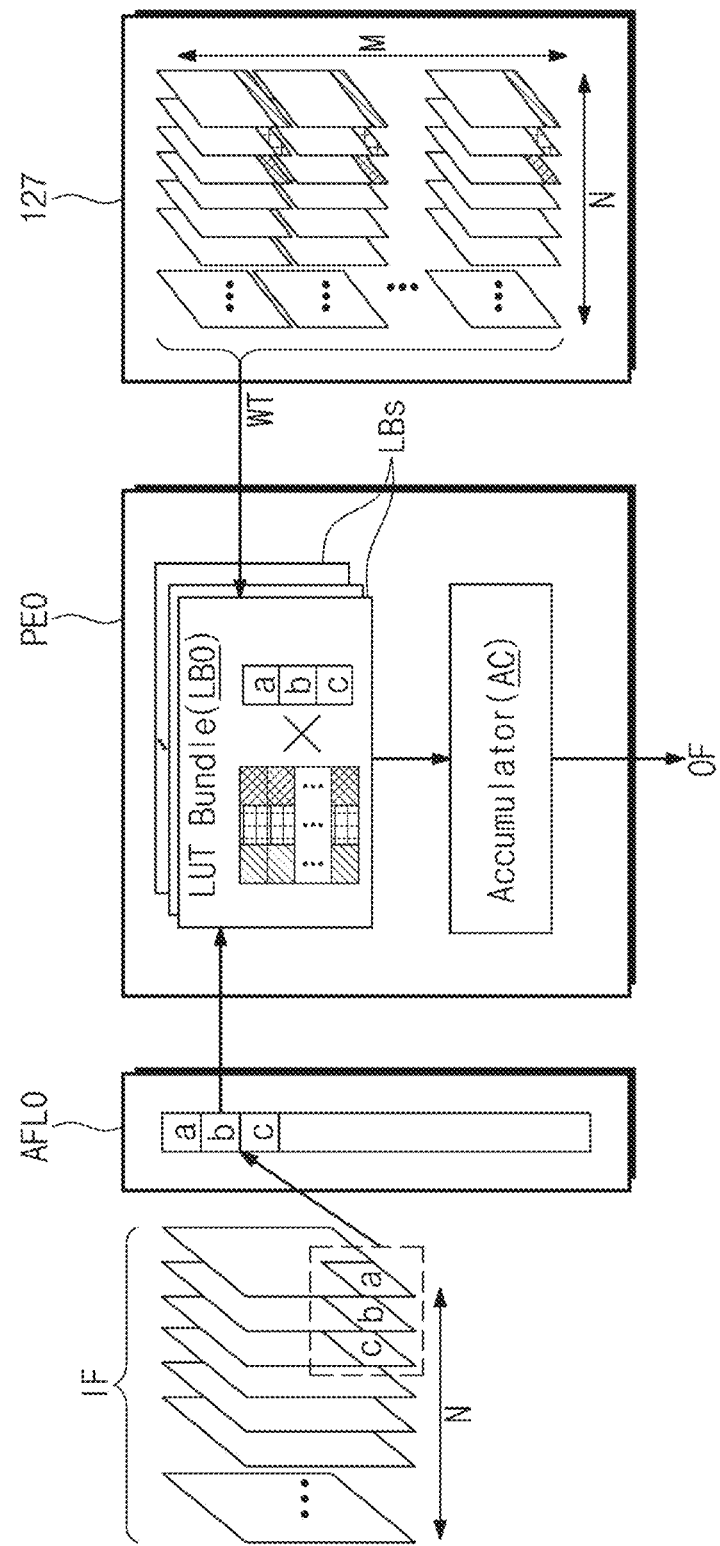
Figure 10:
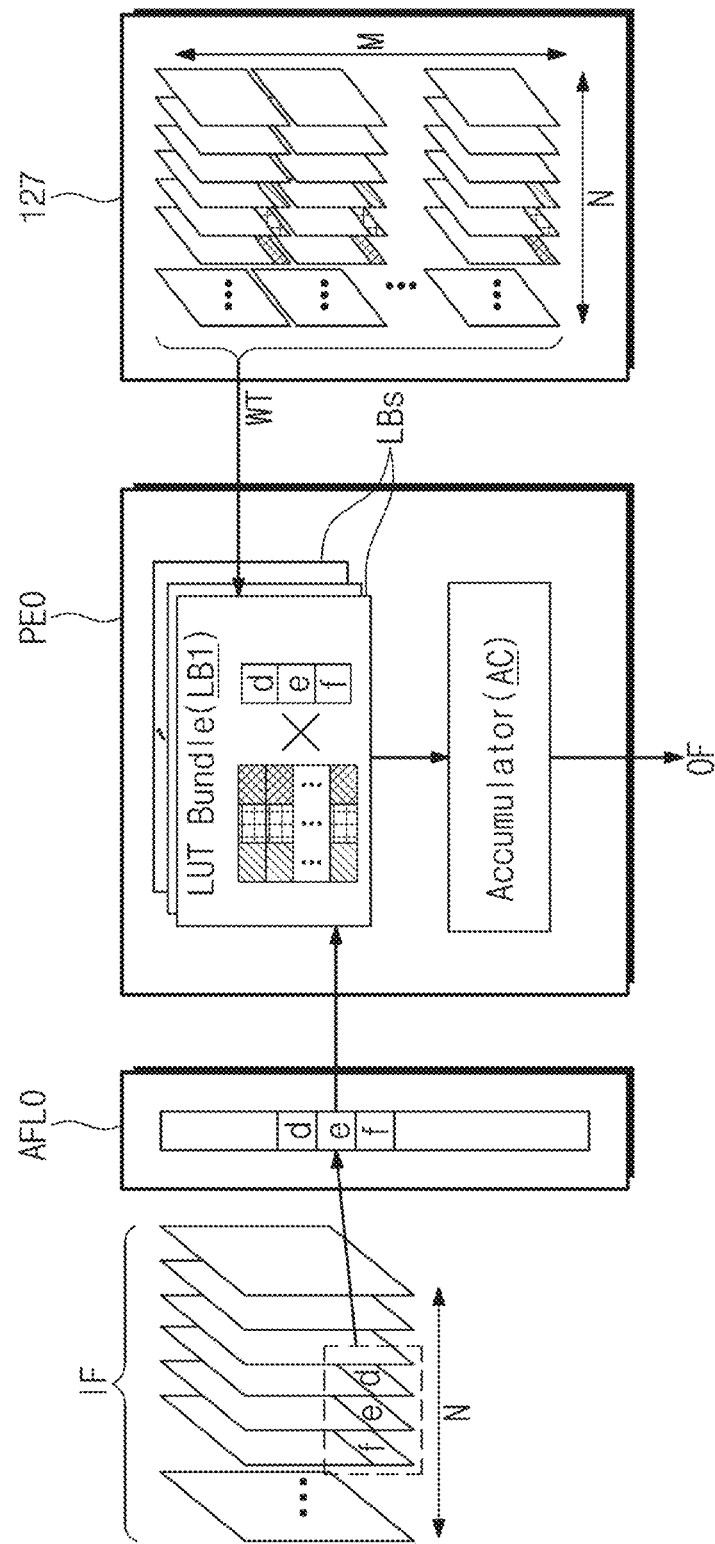

FIGS. 8 to 10 are diagrams for describing how to perform a CNN operation by using processing elements described with reference to FIGS. 1 and 2.

Referring to FIG. 8, the input feature map IF may include, for example, "N" two-dimensional feature maps. The weight WT may be expressed by N-by-M two-dimensional matrices. Some of the two-dimensional feature maps may be multiplied with the "M" two-dimensional weight matrices. In this case, some of the two-dimensional feature maps may be reused "M" times. A matrix multiplication result may be a portion of the output feature map OF. Matrix multiplication results may be accumulated, and thus, the output feature map OF may be generated. The output feature map OF may include "M" two-dimensional feature maps.

Referring to FIG. 9, a portion of the input feature map IF may be fetched to the feature loader AFL0. The input feature map IF fetched to the feature loader AFL0 may include features, which correspond to a particular area, of the "N" two-dimensional feature maps. The fetched input features may be converted into a one-dimensional vector by the feature loader AFL0. The conversion of input features into a one-dimensional vector may be made to reuse a feature map in the CNN operation, as described with reference to FIG. 4.

The first LUT bundle LB0 of the first processing element PE0 may be provided with some of the features of the input feature map IF stored in the feature loader AFL0. For example, feature "a", feature "b", and feature "c" being some of features of three two-dimensional feature maps may be provided to the first LUT bundle LB0. The first LUT bundle LB0 may be provided with a weight corresponding to feature "a", feature "b", and feature "c" from among the weights WT stored in the weight memory 127. For example, some values of "3M" weight matrices of the N-by-M two-dimensional weight matrices described with reference to FIG. 8 may be provided to the first LUT bundle LB0. The first LUT bundle LB0 may generate partial sums based on the matrix multiplication of the received input features and weights. To this end, feature "a", feature "b", and feature "c" may be reused at the first LUT bundle LB0. The accumulator AC may accumulate partial sums output from the first LUT bundle LB0.

Referring to FIG. 10, the second LUT bundle LB1 of the first processing element PE0 may be provided with some of the features of the input feature map IF stored in the feature loader AFL0. The input features that the first LUT bundle LB0 receives may be different from the input features that the second LUT bundle LB1 receives and may be feature "d", feature "e", and feature "f", for example. The second LUT bundle LB1 may be provided with a weight corresponding to feature "d", feature "e", and feature "f" from among the weights WT stored in the weight memory 127. The weights that the first LUT bundle LB0 receives may be different from the weights that the second LUT bundle LB1 receives. The second LUT bundle LB1 may generate partial sums based on the matrix multiplication of the received input features and weights. To this end, feature "d", feature "e", and feature "f" may be reused at the second LUT bundle LB1. The accumulator AC may accumulate partial sums output from the LUT bundles LBs. The output feature map OF may be generated from the accumulator AC as an accumulation result.

Figure 11:
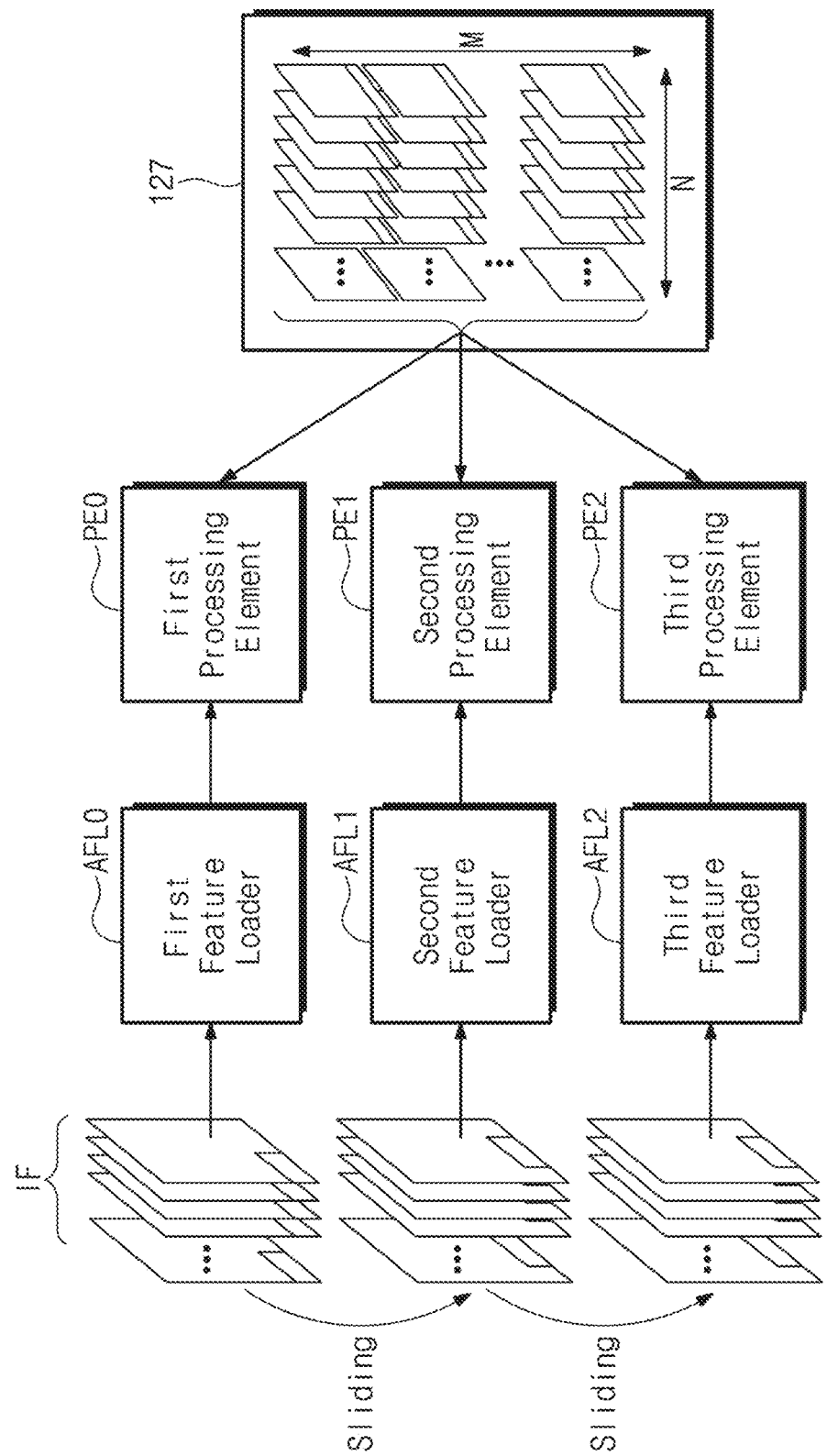
FIG. 11 is a diagram for describing a process in which a CNN operation described with reference to FIGS. 8 to 10 is performed at a DNN core.

FIG. 11 is a diagram for describing a process in which a CNN operation described with reference to FIGS. 8 to 10 is performed at a DNN core. The first to third feature loaders AFL0, AFL1, and AFL2, the first to third processing elements PE0, PE1, and PE2, and the weight memory 127 illustrated in FIG. 11 may be included in one of the DNN cores 121 to 124 of FIG. 1 and may be used to perform the CNN operation described with reference to FIGS. 8 to 10.

The first to third feature loaders AFL0 to AFL2 may fetch a portion of the input feature map IF. At least some of features that each of the first to third feature loaders AFL0 to AFL2 may be different from each other. For example, the first feature loader AFL0 may fetch features of a first area of two-dimensional feature maps, and the second feature loader AFL1 may fetch features of a second area of the two-dimensional feature maps. A portion of the first area and a portion of the second area may overlap each other for the convolution operation. The fetched input feature map IF may be slid in a particular direction.

As described with reference to FIGS. 9 and 10, the first to third processing elements PE0 to PE2 may receive the weights WT from the weight memory 127 and may perform the matrix multiplication on the input features and the weights WT. As a result of the matrix multiplication, each of the first to third processing elements PE0 to PE2 may generate an output feature map. The output feature maps output from the first to third processing elements PE0 to PE2 may be accumulated on the aggregation core 130 of FIG. 1. As such, a final output feature map being a result of the convolution operation may be generated by the aggregation core 130.

Figure 12:
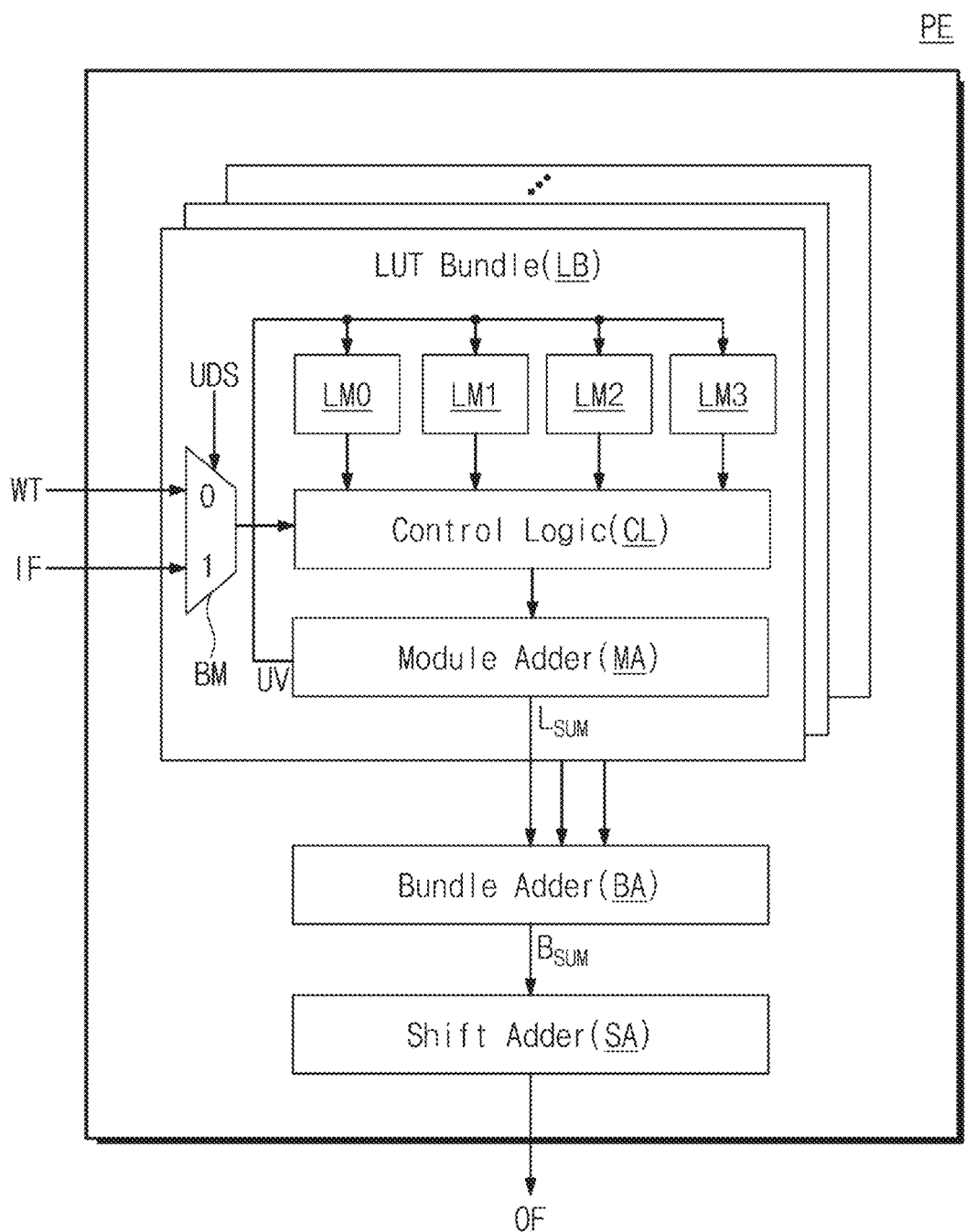
FIG. 12 is an exemplary block diagram of a processing element of FIG. 2.

FIG. 12 is an exemplary block diagram of a processing element of FIG. 2. A processing element PE is configured to perform the bit-serial processing of the weight WT and the reuse of the input feature IF, which are described above.

Referring to FIG. 12, the processing element PE may include the LUT bundles LBs, a bundle adder BA, and a shift adder SA. The bundle adder BA and the shift adder SA may be understood as a component included in the accumulator AC of FIG. 2.

The LUT bundle LB may include a multiplexer BM, a plurality of LUT modules LM0, LM1, LM2, and LM3, control logic CL, and a module adder MA. An example is illustrated in FIG. 12 as the LUT bundle LB includes the four LUT modules LM0, LM1, LM2, and LM3, but the number of LUT modules is not limited thereto.

The multiplexer BM receives the weight WT and the input feature map IF. Here, the input feature map IF may be a one-dimensional feature vector provided from a feature loader as described above. As described above, the weight WT may be a part of weights stored in the weight memory 127. In response to an update signal UDS, the multiplexer BM may output the weight WT to the control logic CL or may output the input feature map IF to the control logic CL.

In the case where a new input feature map IF is received, the update signal UDS may have an active level such that the multiplexer BM outputs the input feature map IF to the control logic CL. The control logic CL may allow the module adder MA to generate an update value UV of a lookup table. The module adder MA may calculate a combination of all partial products of features of the input feature map IF and a 1-bit weight and may generate the update value UV. For example, in the case where the input feature map IF includes feature "A" and feature "B", the update value UV may include "A", "B", "0", and "A+B". The update value UV may be matched with the weight WT and may be managed at the plurality of LUT modules LM0 to LM3.

After the partial products are updated at the plurality of LUT modules LM0 to LM3, the update signal UDS may have an inactive level such that the multiplexer BM outputs the weight WT to the control logic CL. The control logic CL may transfer the weight WT to the plurality of LUT modules LM0 to LM3. The plurality of LUT modules LM0 to LM3 may output partial sums of a product of the weight WT and some features of the input feature map IF, by using the update value UV matched with the received weight WT. The partial sums may be generated by reusing the input feature map IF by using the update value UV.

The module adder MA may accumulate the partial sums received from the plurality of LUT modules LM0 to LM3 and may generate partial sums $L_{SUM}$ of the weight WT and the input feature map IF.

The bundle adder BA may accumulate the partial sums $L_{SUM}$ output from the plurality of LUT bundles LBs and may generate partial sums $B_{SUM}$ corresponding to a feature map input to the plurality of LUT bundles LBs. The shift adder SA may bit-shift and accumulate the partial sums $B_{SUM}$ to generate the output feature map OF.

Figure 13:
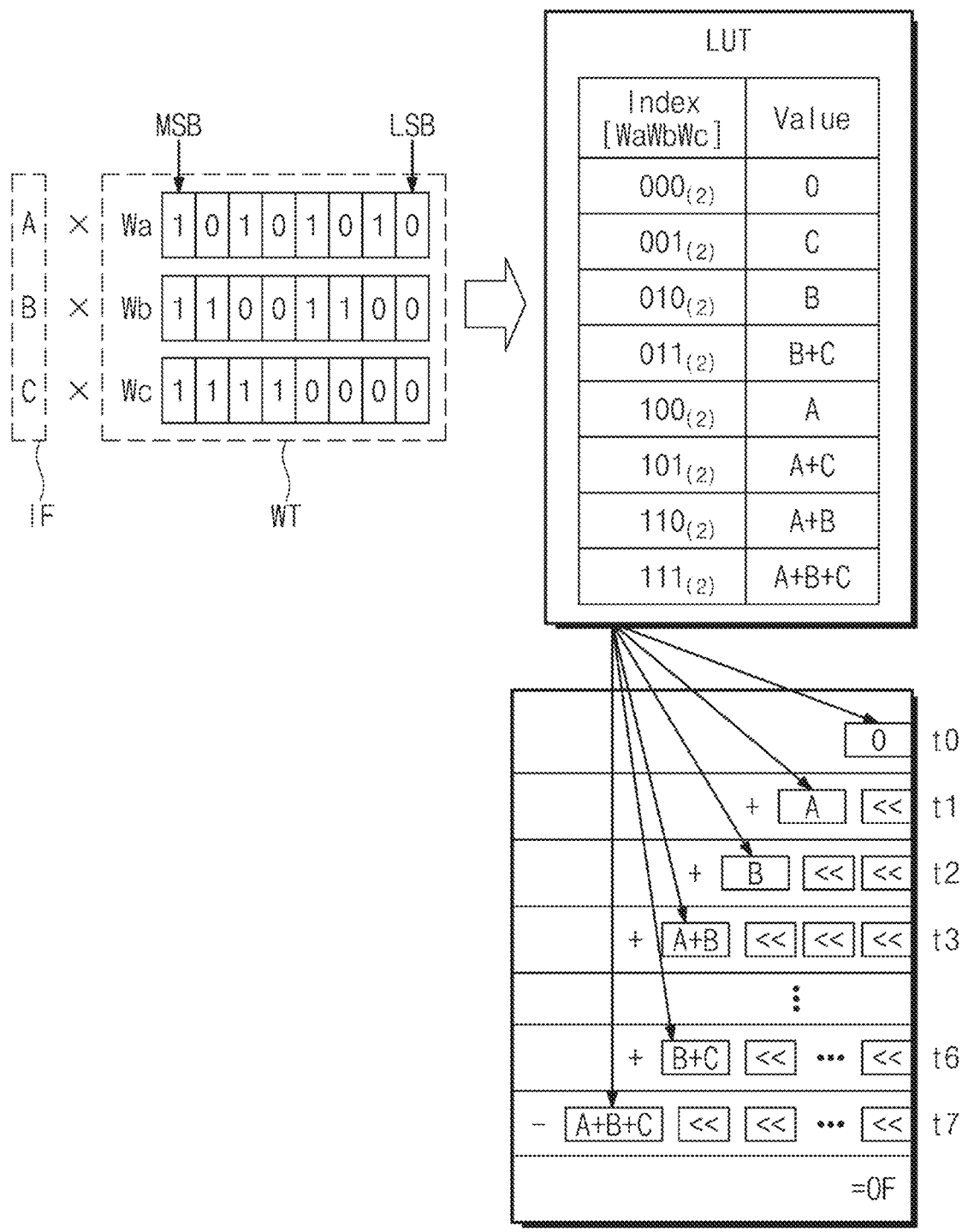
FIG. 13 is a diagram for describing how to generate an output feature map using a lookup table of a processing element of FIG. 12.

FIG. 13 is a diagram for describing how to generate an output feature map using a lookup table of a processing element of FIG. 12. The input feature map IF may include first, second, and third features "A", "B", and "C". First, second, and third weights Wa, Wb, and Wc correspond to the first, second, and third features "A", "B", and "C", respectively. In an update process, all possible partial products of the first, second, and third features "A", "B", and "C" and the first, second, and third weights Wa, Wb, and Wc may be managed at the LUT modules LM0 to LM3 of FIG. 12. The partial products may appear as (0, A, B, C, A+B, A+C, B+C, A+B+C)

The processing element PE may read values corresponding to bits of each of the first, second, and third weights Wa, Wb, and Wc from the lookup table. The processing element PE may accumulate "0" matched with least significant bits "000" during a first time t0 and may bit-shift and accumulate "A" matched with next bits "100" during a second time t1. This operation may be repeated as much as the number of bits of each of the first, second, and third weights Wa, Wb, and Wc. Finally, during an eight time t7, the processing element PE may bit-shift and accumulate "A+B+C" matched with most significant bits "111". In this case, a value of the most significant bits may be subtracted from an accumulated value for the two's complement multiplication. As a result, the output feature map OF corresponding to the first, second, and third features "A", "B", and "C" may be calculated.

The processing element PE may reuse the input feature map IF, that is, the first, second, and third features "A", "B", and "C", based on the lookup table. In this case, the processing element PE may not repeatedly calculate a partial sum of a 1-bit weight. Accordingly, the power efficiency of the processing element PE and the DNN accelerator 100 may be improved.

Figure 14:
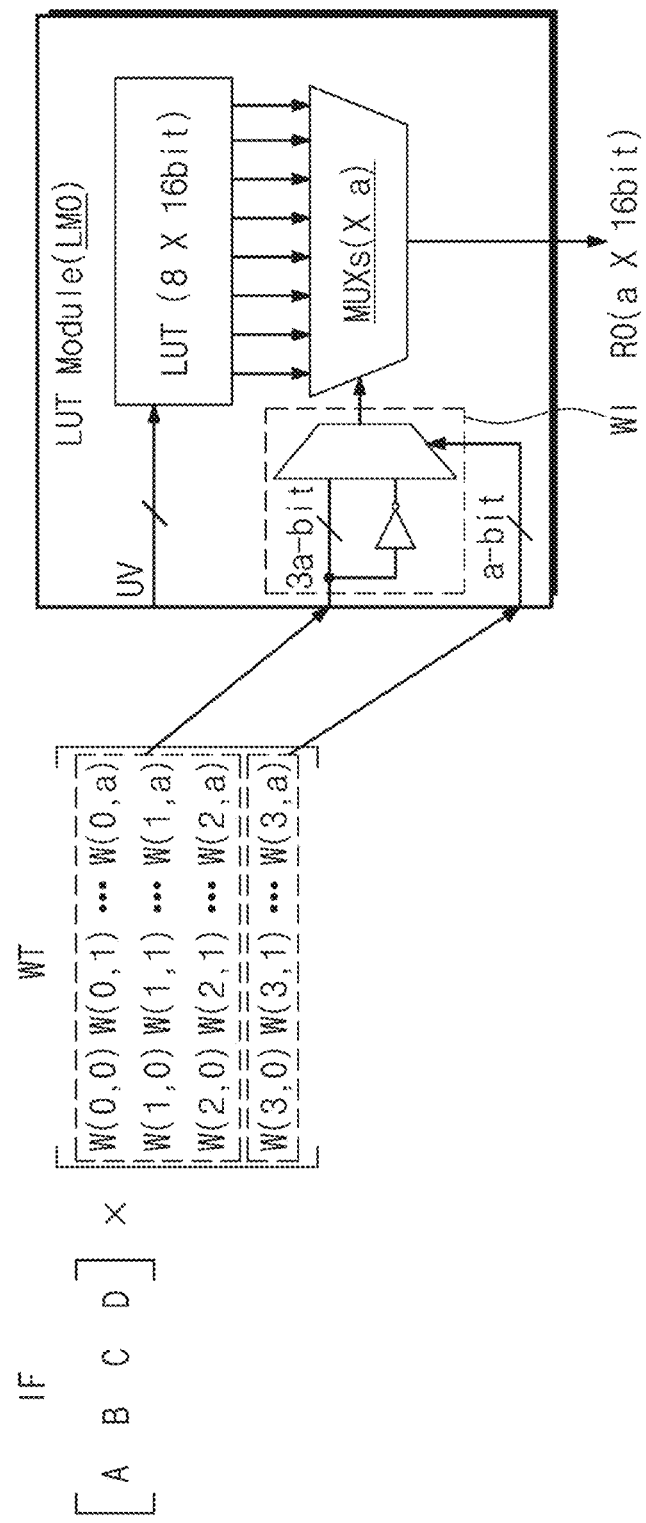
FIG. 14 is a diagram for describing an operation of an LUT module of FIG. 12 in detail.

FIG. 14 is a diagram for describing an operation of an LUT module of FIG. 12 in detail. Referring to FIG. 14, an LUT module LM may include file registers managing a lookup table, multiplexers MUXs, and a weight input circuit WI. For convenience of description, an operation of an LUT module will be described by using detailed numerical values, but it may be understood that the numerical values do not limit a configuration and an operation of the LUT module.

The input feature map IF may include first, second, third, and fourth features "A", "B", "C", and "D". At the weight WT having a 1-bit precision, all the first, second, third, and fourth features "A", "B", "C", and "D" are reused. At the weight WT having a greater precision than the 1-bit precision, the fourth feature "D" is not reused, and the first, second, and third features "A", "B", and "C" are reused.

The file registers may manage the update value UV that is based on the first, second, third, and fourth features "A", "B", "C", and "D" or the first, second, and third features "A", "B", and "C". The file registers may manage values, the number of which is equal to the number of combinations of the first, second, and third features "A", "B", and "C", that is, eight values. To support a maximum of 16-bit weight precision, eight 16-bit file registers may be provided. In this case, the update value UV may be composed of 128 bits.

The multiplexers MUXs may include 12 multiplexers for a parallel access to the file registers. In this case, "a" may be "12", and the weight WT that is covered at the LUT module LM0 may be a 4×12 matrix. In the case where one LUT bundle includes four LUT modules, a weight that is covered at one LUT bundle may be a 12×12 matrix. In the case where one processing element includes four LUT bundles, a weight that is covered at one processing element may be a 48×12 matrix. In this case, when one processing element performs the MAC operation of 16-bit weight precision, the processing element may perform 48×12 MAC operations during 16 cycles.

The weight input circuit WI may receive weight values of 3×12 bits or 4×12 bits corresponding to the number of multiplexers MUXs, per cycle. Weight values that are received in one cycle may be bits corresponding to the same position from among elements of a weight matrix. For example, in a first cycle, received weight values may be bits corresponding to least significant bit positions from among the elements of the weight matrix.

At the weight WT having the 1-bit precision, the weight input circuit WI may receive 4×12 bit weight values. Based on weight values (i.e., 12 bits) at the fourth rows of the weight matrix, weight values (i.e., 36 bits) at the first to third rows or inverted versions of the weight values may be output to the multiplexers MUXs. The weight values at the fourth rows may be values for selecting addition or subtraction, in the MAC operation of the weight values at the first to third rows. The weight WT having the 1-bit precision will be more fully described with reference to FIG. 15.

At the weight WT having a greater bit precision than the 1-bit precision, the weight input circuit WI may receive 3×12 bit weight values. Weight values (i.e., 36 bits) at the first to third rows may be output to the multiplexers MUXs. In this case, the MAC operation may be performed as illustrated in FIG. 13. The weight WT having the greater precision than the 1-bit precision will be more fully described with reference to FIG. 16.

The multiplexers MUXs may generate an output result RO, based on weight values provided through the weight input circuit WI. The multiplexers MUXs may read the update value UV corresponding to the received weight values from the file registers. The multiplexers MUXs may output a value read from a file register as the output result RO. For example, the output result RO may be output to the module adder MA of FIG. 12 for the purpose of a partial sum operation. In this case, the input feature map IF may be reused every cycle. Also, because the output result RO is generated based on the update value UV of the lookup table, power consumption due to repetitive calculation of the weight WT and the input feature map IF may decrease.

Figure 15:
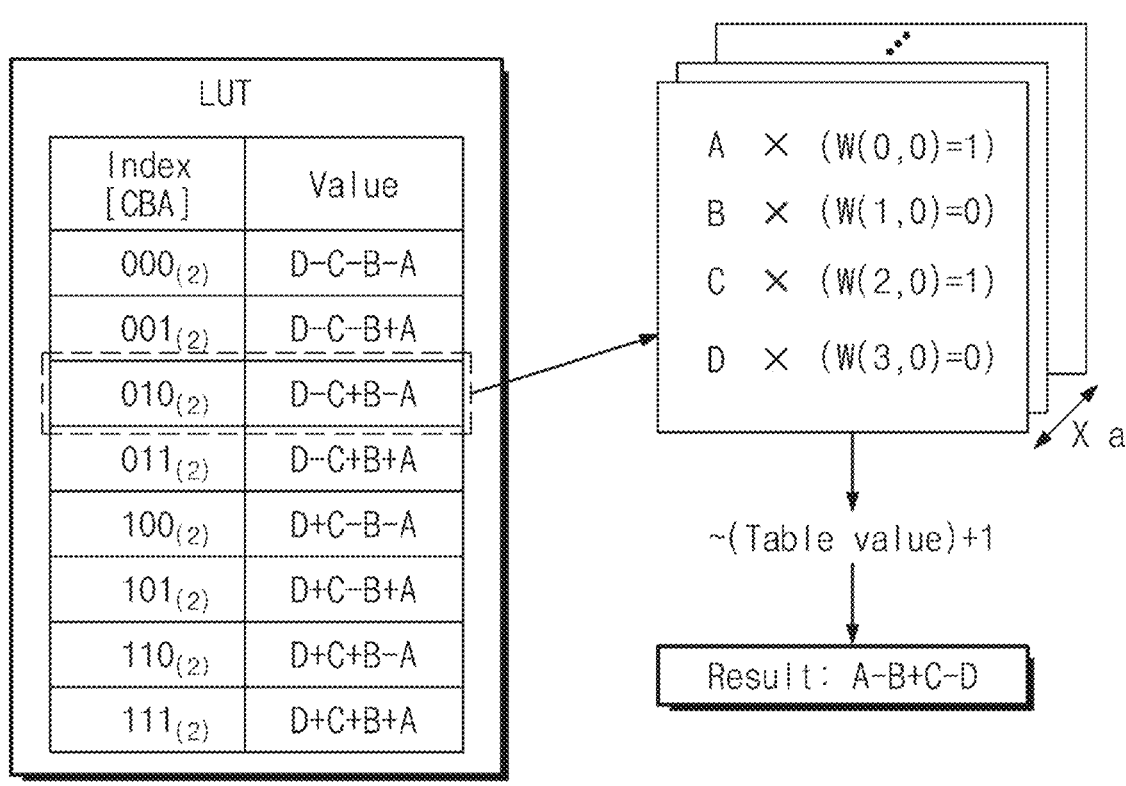
FIG. 15 is a diagram for describing an operation of an LUT module, at a weight having a 1-bit precision.

FIG. 15 is a diagram for describing an operation of an LUT module, at a weight having a 1-bit precision. In FIG. 15, a lookup table is updated based on the first, second, third, and fourth features "A", "B", "C", and "D" of FIG. 14. In an update operation, it may be understood that a feature corresponding to "0" of a weight value is subtracted. At the weight WT of FIG. 14, 1-bit-weight values may constitute a two-dimensional matrix. In an embodiment, it is assumed that weight values W(0,0), W(1,0), W(2,0), and W(3,0) at the first column of the weight WT of FIG. 14 is "1", "0", "1", and "0". Weight values at the remaining columns may be processed at the remaining multiplexers of the LUT module.

Because W(3,0) is "0", the multiplexer MUX of FIG. 14 may receive inverted weight values. That is, the multiplexer MUX may receive "0" being an inverted version of the weight value W(0,0), "1" being an inverted version of the weight value W(1,0), and "0" being an inverted version of the weight value W(2,0). As such, "D-C+B-A" corresponding to an index "010" of the lookup table may be read from file registers. Because W(3,0) is "0", an output result may be "A-B+C-D" being an inverted version of "D-C+B-A". That is, weights at the fourth row corresponding to the fourth feature "D" may be used to decide whether to invert an output result.

Figure 16:
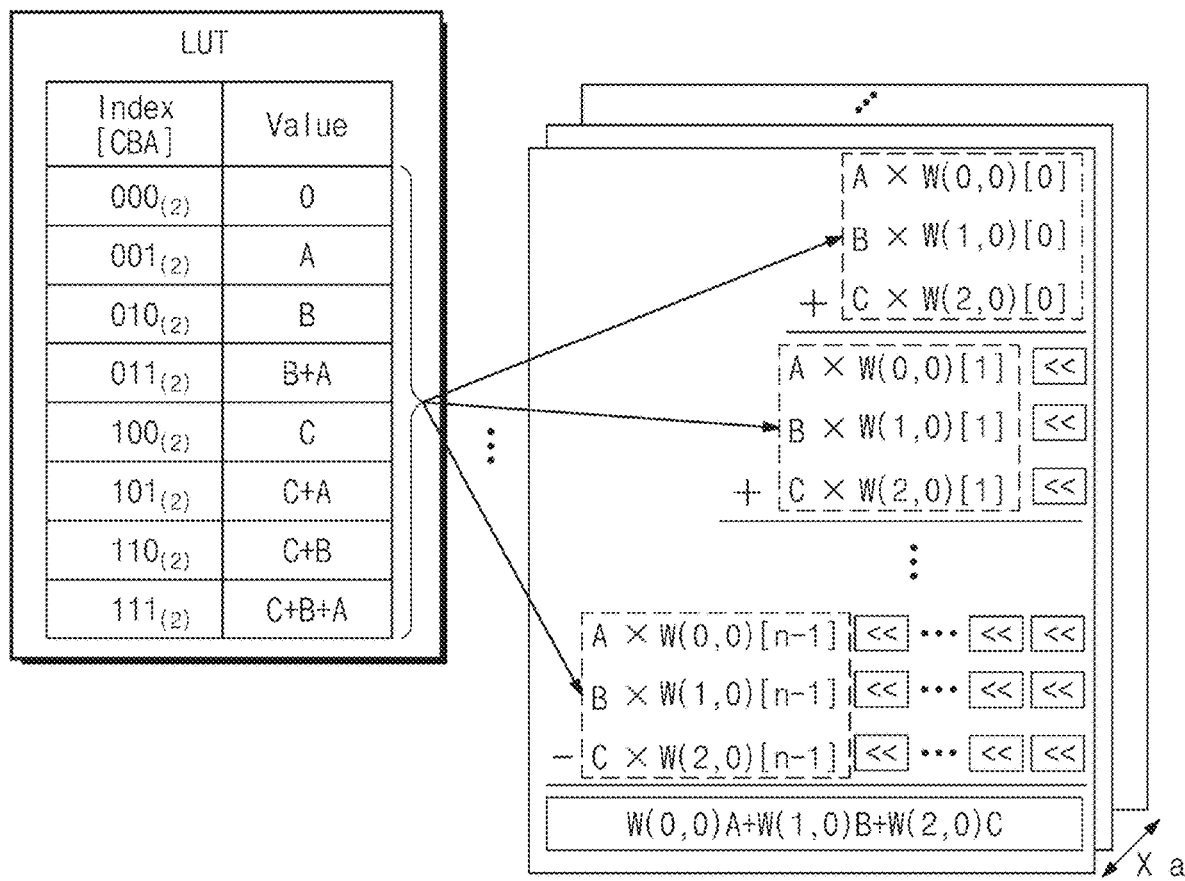
FIG. 16 is a diagram for describing an operation of an LUT module, at a weight having a greater precision than a 1-bit precision.

FIG. 16 is a diagram for describing an operation of an LUT module, at a weight having a greater precision than a 1-bit precision. In FIG. 16, a lookup table is updated based on the first, second, and third features "A", "B", and "C" of FIG. 14. At the weight WT of FIG. 14, n-bit-weight values may constitute a two-dimensional matrix. Weight values at the first to third rows of the weight WT may be output to the multiplexer MUX.

During a first time, the multiplexer MUX may receive W(0,0)[0], W(1,0)[0], and W(2,0)[0] being least significant bits of W(0,0), W(1,0), and W(2,0). As such, values of the lookup table corresponding to the least significant bits may be read from the file registers. During a second time, the multiplexer MUX may receive W(0,0)[1], W(1,0)[1], and W(2,0)[1] being next bits of the least significant bits of W(0,0), W(1,0), and W(2,0). As such, output results may be bit-shifted and may be accumulated on the output result generated at the first time. W(0,0)[n−1], W(1,0)[n−1], and W(2,0)[n−1] being the most significant bits of W(0,0), W(1,0), and W(2,0) may be subtracted from the accumulated value depending on the two's complement multiplication. W(0,0)A+W(1,0)B+W(2,0)C may be generated based on the above operations.

That is, by using the LUT module of FIG. 14, the 1-bit weight precision may be supported as illustrated in FIG. 15, and a greater precision than the 1-bit weight precision may be supported as illustrated in FIG. 16.

According to an embodiment of the inventive concept, a deep neural network accelerator including lookup table based bit-serial processing elements may support various bit-precisions and may improve a power efficiency.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A deep neural network accelerator comprising:
a feature loader configured to store input features;
a weight memory configured to store a weight; and
a processing element comprising at least one lookup table bundle and an accumulator, wherein the processing element is configured to, in a current operation:
obtain the input features from the feature loader, the input features comprising at least one input feature utilized in a previous operation prior to the current operation;
obtain weight values;
generate results according to the weight values by applying the weight values to the input features including the at least one input feature utilized in the previous operation;
receive, by the at least one lookup table bundle, at least one target weight corresponding to the input features; and
generate output features by:
selecting a target result corresponding to the received at least one target weight from among the results; and
accumulating, by the accumulator, the target result,
wherein, based on the obtained weight values having a 1-bit precision, each of the at least one input feature utilized in the previous operation are utilized in the current operation,
wherein, based on the obtained weight values having a precision that is greater than 1-bit precision, fewer than each of the at least one input feature utilized in the previous operation are utilized in the current operation, and
wherein the processing element further comprises:
file registers configured to store the results;
multiplexers configured to receive the at least one target weight and to select the target result from the file registers; and
a weight input circuit configured to receive weight values as much as the number of bits identical to a product of the number of the input features and the number of the multiplexers, at the at least one target weight, and to transfer the received weight values to the multiplexers.

2. The deep neural network accelerator of claim 1, wherein the processing element is configured to:
receive first bits of the at least one target weight during a first time;
select a first target result corresponding to the first bits from among the results;
receive second bits of the at least one target weight during a second time after the first time;
select a second target result corresponding to the second bits from among the results; and
accumulate the second target result on the first target result.

3. The deep neural network accelerator of claim 1, wherein the processing element is configured to:
generate all combinations of the weight values having the 1-bit precision; and
calculate a partial product of the input features and the weight values having the 1-bit precision with respect to each of the combinations to generate the results.

4. The deep neural network accelerator of claim 1, wherein the at least one target weight includes first weight values corresponding to each of the input features and a second weight value deciding whether to invert the target result,
wherein the first weight values and the second weight value are a 1-bit weight having a first value or a second value,
wherein, when the second weight value is the first value, the processing element selects the target result based on the first weight values and generates the output features based on the target result, and
wherein, when the second weight value is the second value, the processing element inverts the first weight values to select the target result and inverts the target result to generate the output features.

5. The deep neural network accelerator of claim 1, wherein the at least one target weight includes weight values respectively corresponding to the input features, the number of bits of each of the weight values is more than one, and
wherein the processing element selects a first target result based on least significant bits of the weight values, selects a second target result based on bits of the weight values, which are positioned between the least significant bits and most significant bits of the weight values, and selects a third target result based on the most significant bits of the weight values.

6. The deep neural network accelerator of claim 5, wherein the processing element bit-shifts the second target result, adds the bit-shifted second target result to the first target result to generate an intermediate accumulation result, and bit-shifts the third target result to subtract the bit-shifted third target result from the intermediate accumulation result.

7. The deep neural network accelerator of claim 1, wherein the at least one lookup table bundle comprises:
a first lookup table bundle configured to generate first results corresponding to first features of the input features, to receive a first target weight corresponding to the first features from the weight memory, and to output a first target result corresponding to the first target weight from among the first results;
a second lookup table bundle configured to generate second results corresponding to second features of the input features, to receive a second target weight corresponding to the second features from the weight memory, and to output a second target result corresponding to the second target weight from among the second results; and
wherein the accumulator is configured to accumulate the first target result and the second target result to generate the output features.

8. The deep neural network accelerator of claim 1, wherein the processing element includes:
a multiplexer configured to output the input features received from the feature loader or the at least one target weight received from the weight memory, based on an update signal;
a first lookup table module configured to store first results corresponding to first features of the input features, to receive a first target weight, which is a first portion of the output at least one target weight, corresponding to the first features from the multiplexer, and to output a first target result corresponding to the first target weight from among the first results;
a second lookup table module configured to store second results corresponding to second features of the input features, to receive a second target weight, which is a second portion of the output at least one target weight, corresponding to the second features from the multiplexer, and to output a second target result corresponding to the second target weight from among the second results; and
a module adder configured to generate the first results based on the first features, to generate the second results based on the second features.

9. The deep neural network accelerator of claim 1, wherein the feature loader aligns a first portion of a first input feature map and a second portion of a second input feature map to generate the input features.

10. A deep neural network accelerator comprising:
deep neural network cores each configured to generate an output feature map based on an input feature map and a weight; and
an aggregation core configured to receive the output feature map from each of the deep neural network cores and to accumulate the received output feature map to generate a final output feature map,
wherein each of the deep neural network cores includes:
a weight memory configured to store the weight;
feature loaders each configured to store input features being a portion of the input feature map; and
processing elements each configured to, in a current operation:
receive the input features from one of the feature loaders, the input features comprising at least one input feature utilized in a previous operation prior to the current operation;
obtain weight values;
generate results according to the weight values by applying the weight values to the input features including the at least one input feature utilized in the previous operation;
receive, by at least one lookup table bundle, at least one target weight corresponding to the input features; and
generate output features by:
selecting a target result corresponding to the received at least one target weight from among the results; and
accumulating the target result, wherein, based on the obtained weight values having a 1-bit precision, each of the at least one input feature utilized in the previous operation are utilized in the current operation, wherein, based on the obtained weight values having a precision that is greater than 1-bit precision, fewer than each of the at least one input feature utilized in the previous operation are utilized in the current operation, and wherein each of the processing elements includes:
- a first lookup table bundle configured to generate first results corresponding to first features of the input features, to receive a first target weight corresponding to the first features from the weight memory, and to output a first target result corresponding to the first target weight from among the first results;
- a second lookup table bundle configured to generate second results corresponding to second features of the input features, to receive a second target weight corresponding to the second features from the weight memory, and to output a second target result corresponding to the second target weight from among the second results; and
- an accumulator configured to accumulate the first target result and the second target result to generate the output features.

11. The deep neural network accelerator of claim 10, wherein a first feature loader of the feature loaders outputs input features corresponding to a first area of the input feature map to a first processing element of the processing elements, and wherein a second feature loader of the feature loaders outputs input features corresponding to a second area of the input feature map to a second processing element of the processing elements.

12. The deep neural network accelerator of claim 11, wherein a portion of the first area overlaps a portion of the second area.

13. The deep neural network accelerator of claim 10, wherein the input feature map includes a first feature map and a second feature map, and wherein each of the feature loaders extracts the first features from the first feature map, extracts the second features from the second feature map, transfers the first features to the first lookup table bundle, and transfers the second features to the second lookup table bundle.

14. The deep neural network accelerator of claim 10, wherein the first lookup table bundle includes:
- a first lookup table module configured to store a first portion of the first results and to output a first target portion of the first target result based on the first portion;
- a second lookup table module configured to store a second portion of the first results and to output a second target portion of the first target result based on the second portion; and
- a first module adder configured to generate the first results based on the first features and to generate the first target result by accumulating the first target portion and the second target portion, and wherein the second lookup table bundle includes:
- a third lookup table module configured to store a third portion of the second results and to output a third target portion of the second target result based on the third portion;
- a fourth lookup table module configured to store a fourth portion of the second results and to output a fourth target portion of the second target result based on the fourth portion; and
- a second module adder configured to generate the second results based on the second features and to generate the second target result by accumulating the third target portion and the fourth target portion.

15. The deep neural network accelerator of claim 10, wherein the at least one target weight includes first weight values corresponding to each of the input features and a second weight value deciding whether to invert the target result, wherein the first weight values and the second weight value are a 1-bit weight having a first value or a second value, wherein, when the second weight value is the first value, at least one of the processing elements selects the target result based on the first weight values and generates the output features based on the target result, and wherein, when the second weight value is the second value, the at least one of the processing elements inverts the first weight values to select the target result and inverts the target result to generate the output features.

16. The deep neural network accelerator of claim 10, wherein the at least one target weight includes weight values respectively corresponding to the input features, the number of bits of each of the weight values is more than one, and wherein each of the processing elements
selects the first target result based on least significant bits of the weight values, selects the second target result based on bits of the weight values, which are positioned between the least significant bits and most significant bits of the weight values, and selects a third target result based on the most significant bits of the weight values.

17. The deep neural network accelerator of claim 16, wherein each of the processing elements bit-shifts the second target result, adds the bit-shifted second target result to the first target result to generate an intermediate accumulation result, and bit-shifts the third target result to subtract the bit-shifted third target result from the intermediate accumulation result.

* * * * *